United States Patent Office 3,281,614
Patented Oct. 25, 1966

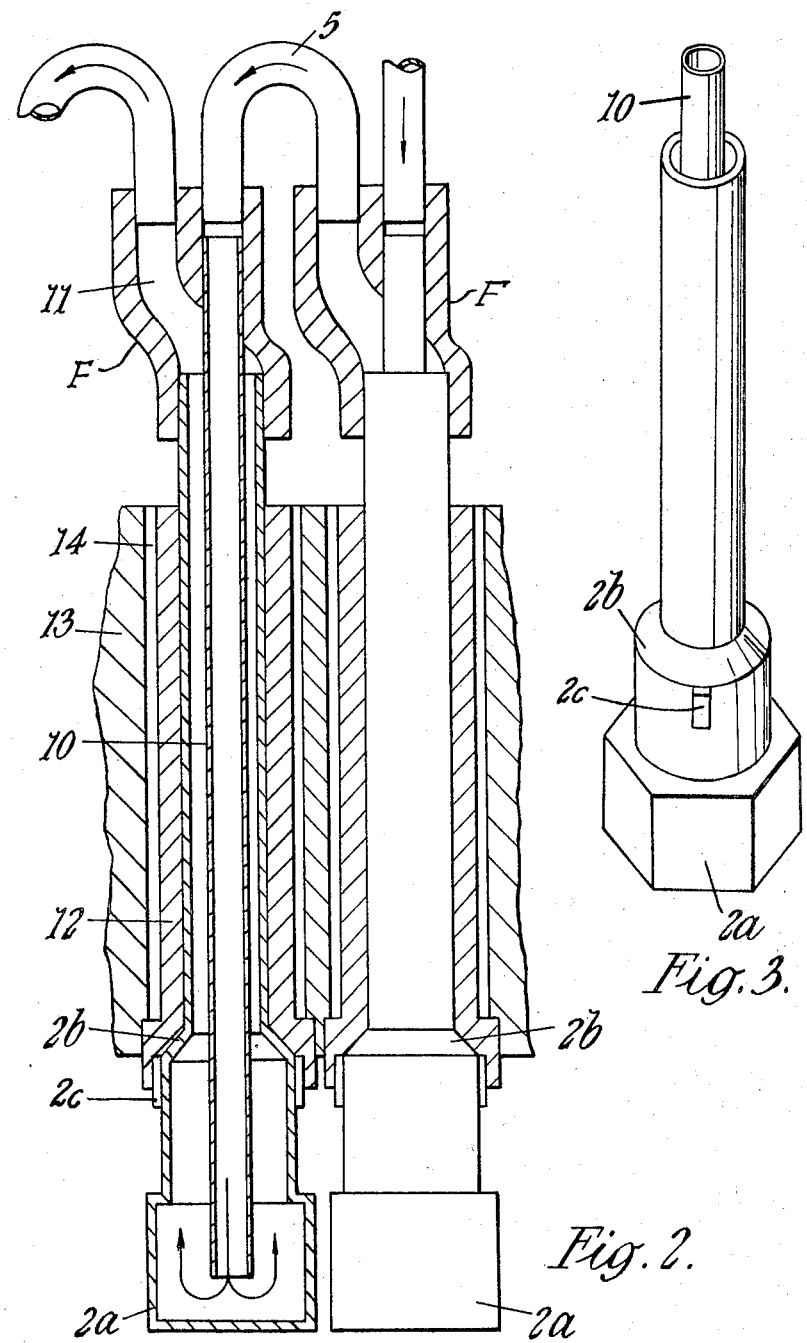

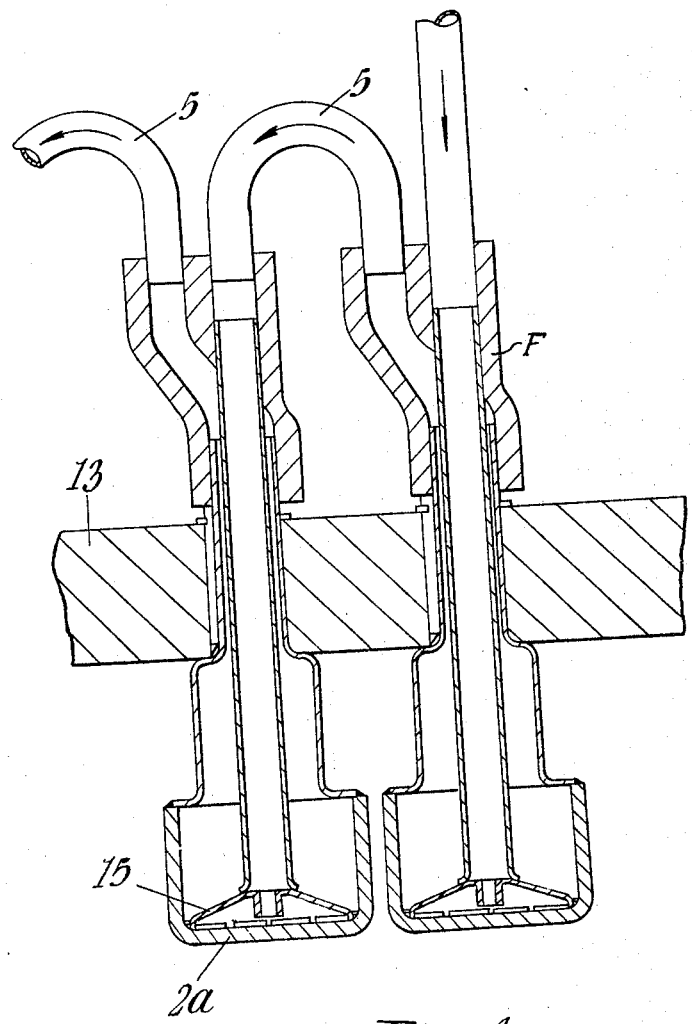

3,281,614
APPARATUS FOR THE DIRECT GENERATION
OF ELECTRICITY
Bryan Charles Lindley and Felix Jeremy Philip Crampton,
Newcastle upon Tyne, England, assignors to C. A. Parsons & Company Limited, Newcastle upon Tyne, England, a company of Great Britain
Filed May 20, 1963, Ser. No. 281,546
Claims priority, application Great Britain, May 31, 1962, 21,087/62
3 Claims. (Cl. 310—11)

This invention relates to apparatus for the direct generation of electricity and is concerned with apparatus in which an ionised gas is driven through a magnetic field transverse to the direction of gas flow.

The process which uses principle of electricity generation is commonly known as a magnetohydrodynamic or a magneto plasma dynamic (hereinafter abbreviated MHD) process.

Basically the apparatus consists of a duct or nozzle through which a heated gas is passed and a magnetic field is set up by external means across the duct transverse to the direction of gas flow. Electrodes are placed on parts of the ducts to collect current generated by the flow of conducting gas through the magnetic field in accordance with well known principles.

There are two difficulties associated with such apparatus. The first is that of preventing damage to the material of the duct as a result of the high gas temperatures required. The second is due to the Hall effect as a result of which the electric field generated does not act perpendicular to the electrodes but has a component in the direction of the axis of the duct. This means that there is an electrical potential in the direction of the duct axis and it becomes desirable to have a series of electrodes electrically insulated from each other in the direction of the axis of the duct.

The first difficulty can be overcome by cooling the wall of the duct but this problem is made more complicated because of the second difficulty mentioned above.

The object of the present invention is to provide an improved duct wall and electrode construction for such apparatus in which the aforementioned difficulties are substantially overcome in a simple and effective way.

The invention consists in means for generating electricity in accordance with any of the following numbered clauses namely:

(1) Means for generating electricity in which an electrically conducting gas is driven through a duct across which is generated a magnetic field transverse to the direction of gas flow in which means at least part of the wall of the duct in contact with the gas is constructed of a plurality of spaced elements insulated electrically from one another and each liquid cooled;

(2) Means for generating electricity as in Clause 1 in which some of the elements are used as electrodes;

(3) Means for generating electricity as in Clause 1 in which the duct has two pairs of opposed walls the elements of one pair of opposed walls being used as electrodes;

(4) Means for generating electricity as in Clause 1 in which the elements are insulated from each other electrically by means of a gas;

(5) Means for generating electricity as in Clause 1 in which the elements are insulated from each other electrically by the gas flowing through the duct;

(6) Means for generating electricity as in Clause 1 in which the elements are insulated from each other electrically by means of solid insulation;

(7) Means for generating electricity as in Clause 1 in which the elements at their ends nearest the gas in the duct are of hexagonal cross-section;

(8) Means for generating electricity as in Clause 1 in which the elements at their ends nearest the gas in the duct are of rectangular cross-section;

(9) Means for generating electricity as in Clause 1 in which the elements at their ends nearest the gas in the duct are of triangular cross-section;

(10) Means for generating electricity as in Clause 1 in which each element has a tapered projection at right angles to its face in contact with the gas in the duct, which projection fits into a tapered recess in a wall surrounding said elements;

(11) Means for generating electricity as in Clause 1 or Clause 10 in which each element has a projection which passes through a wall surrounding the elements, said projections being connected to a supply of cooling liquid and being spaced from the wall for the greater part of their length in the wall;

(12) Magneto-hydro-dynamic i.e. MHD apparatus for the direct generation of electricity comprising a duct across which a magnetic field is generated perpendicular to the axis of the duct, a flow of ionised gas being circulated through the duct and electrodes provided on the duct for collecting electricity generated; the duct having its face in contact with the ionised gas, and being constructed of a plurality of spaced elements of hexagonal or square cross-section; the elements being electrically insulated from one another by solid insulation or by directing a gas through the spaces between the elements; and on the side of each element remote from the gas stream is a tapered projection at right angles to the element and this projection fits into a tapered recess in a wall surrounding the duct, these projections serving to locate and lock the elements in position; connected with each element is a supply of cooling liquid for example water; the liquid is circulated through the part of the element in contact with the ionised gas and then leaves the element; the dimensions of the faces of the elements in contact with the gas are preferably small in relation to the dimensions of the duct, for example, if they were hexagonal shaped a diagonal would not normally be greater than one tenth the duct diameter or width as the case may be; the elements may all be the same material and some may act as electrodes for the collection of electricity, and if desired different materials can be used for the elements in different parts of the duct, so that if, for example, some of the elements do act as electrodes they may be of different material from the remainder.

(13) MHD apparatus as described below with reference to the accompanying drawings in which:

FIGURE 1 is a perspective view of a duct having one wall cut away for part of its length to show the construction of the inner surfaces of the duct, FIGURE 2 is a section through two adjacent elements of the duct inner surface in accordance with one embodiment of the invention, FIGURE 3 is a perspective view of an element of FIGURE 2 showing connections for cooling liquid, and FIGURE 4 is a section through two adjacent elements of the duct inner surface in accordance with an alternative embodiment of the invention.

In carrying the invention into effect in the forms illustrated by way of example a MHD apparatus for the direct generation of electricity comprises a duct 1 across which a magnetic field is generated perpendicular to the axis of the duct. A flow of ionised gas is circulated through the duct and electrodes are provided on the duct as described below for collecting electricity generated.

The duct has its face in contact with the ionised gas, constructed of a plurality of spaced elements of triangular, hexagonal, square or rectangular cross-section. The elements are electrically insulated from one another by solid insulation or by a gas in the spaces between the elements.

In FIGURE 1 the spaced elements on two opposite walls are hexagonal shaped modules 2 and on the other two opposite walls the elements are rectangular shaped electrodes 3.

Connected with each element is a supply of cooling liquid for example water. The liquid is circulated through the part of the element in contact with the ionised gas and then leaves the element.

The dimensions of the faces of the modules 2 in contact with the gas are preferably small in relation to the dimensions of the duct, for example, if they are hexagonal shaped a diagonal would not normally be greater than one tenth the duct diameter or width as the case may be. In the case of electrodes a rectangular element could with no less in performance extend the full width of the duct in the direction of the magnetic field as shown in FIGURE 1.

The elements may all be of the same material or if desired, different materials can be used for the elements in different parts of the duct. Those elements which act as electrodes may be of different material from the remainder.

The connections for the conveyance of cooling liquid to and from each element for the sake of clarity are not all shown in FIGURE 1. The modules 2 are connected in series across the duct in the form shown but this is not essential. Cooling liquid enters an inlet pipe 4, flows through a module and then leaves that module and enters the next module through interconnection 5. The modules may be connected in parallel instead of in series or they may be connected in series and parallel if desired.

Similar connections are made to electrodes 3 and in the form shown in FIGURE 1 by way of example, cooling liquid enters one electrode through inlet pipe 6 flows upwardly through the electrode to leave via pipe 6 and thence through interconnection 7 to the next electrode where it flows downwardly to an outlet and so on along the duct until outlet pipe 8 is reached. The electrodes have connected thereto electrical connections 9.

In FIGURE 1 the gas flowing through the duct also electrically insulates each element from another. Alternatively a separate gas may be used or solid insulation be used.

Referring to FIGURE 2 two adjacent modules of hexagonal cross-section at their ends nearest the gas stream are shown. Each module is hollow and passing down the center thereof is a duct 10 through which cooling liquid flows to the face of the module in contact with the gas in the duct, i.e. face 2a. The liquid flows upwards in the space surrounding the duct 10 and passes to an outlet 11 which is connected to interconnection 5. As shown in FIGURE 2 fittings F are associated with each element and include a first bore which receives duct 10 and either an inlet pipe 4 or one end of an interconnection pipe 5. Each fitting also includes a second bore that at one end is dimensioned to fit around each module or thermally conductive element, and at its other end receives one end of the interconnection 5. The space within this bore defines the outlet channel 11.

On the side of each element remote from the gas stream are tapered projections 2b which engage tapered recesses in a sleeve 12 which is in turn located in a wall or body member 13 forming the outer surface to the duct 1. The elements are keyed to the sleeves 12 by keys 2c. The degree of taper can be varied to suit circumstances for the arrangement shown in FIGURE 2 to the less pronounced taper shown in FIGURE 4. The tapered recess may, for example, extend for a distance equivalent to the thickness of wall 13. These projections serve to locate and lock the elements in position. The sleeve 12 is spaced from wall 13 for the greater part of its length by space 14 which reduces heat conduction to the wall 13.

FIGURE 3 shows the hexagonal shape of the end of the module in prespective view.

FIGURE 4 shows a similar construction to that of FIGURE 2 except that the cross-section of the part of the module nearest the gas is of square cross-section and a deflector plate 15 is used to help distribute the cooling liquid over the face 2a. Such deflector plates may also be used in the construction of FIGURE 2.

Figure 1:
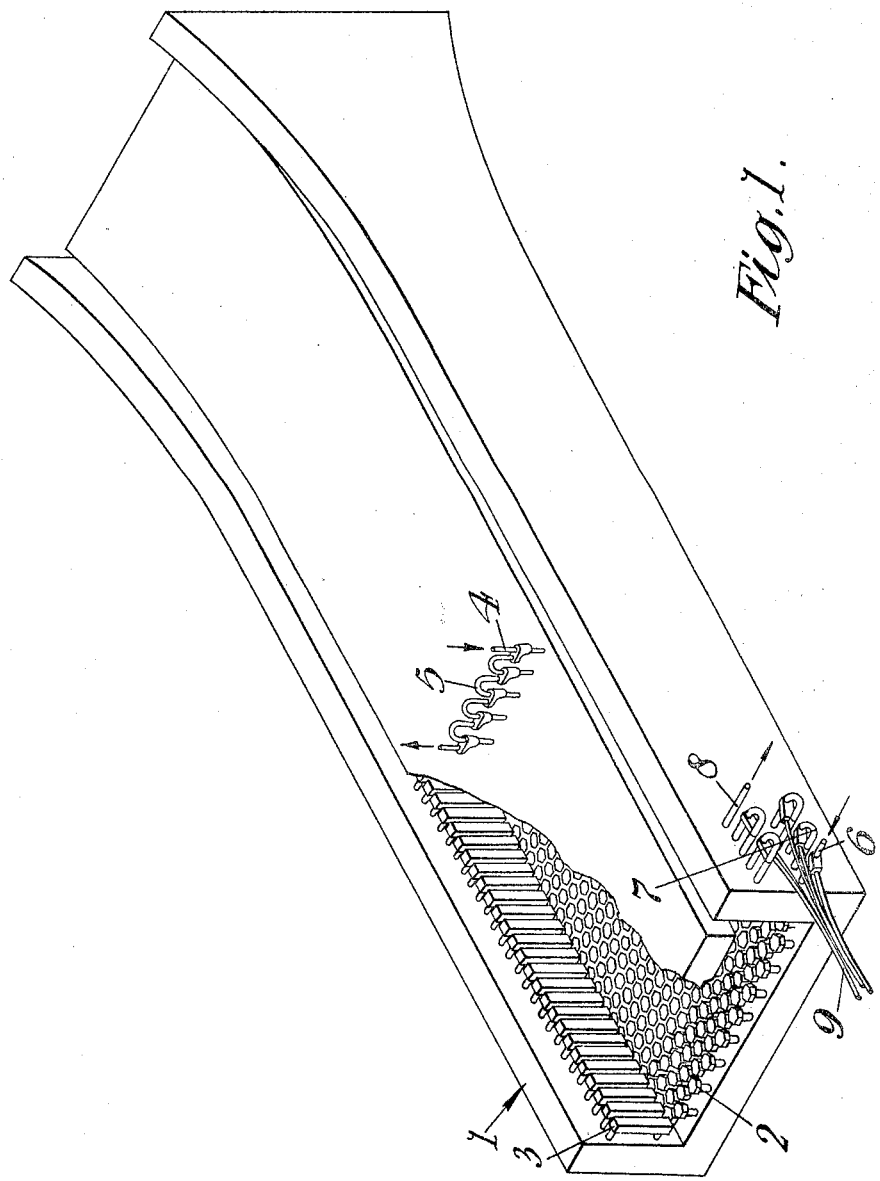

The cooling arrangements from the electrodes are basically the same as for the modules.

What is claimed is:

1. In a gas-accommodating duct for a MHD generator a wall structure comprising a wall member having apertures therethrough, a tubular thermally conductive element passing through each aperture in spaced relation thereto over a substantially greater portion of the extent of the aperture and having one end portion projecting beyond that side of the wall member that will be in contact with gas flowing through the duct, said one end portion being closed, an inner tubular member disposed within and spaced from the interior of each tubular element, each inner tubular member extending to a position adjacent the closed end of each tubular element and terminating in an outlet end, inlet means connected to the other end of each tubular member, an outlet means connected to the other end of each tubular element whereby cooling liquid can flow through the inner tubular members into contact with the closed end of the tubular elements and thence in the reverse direction through the space between the respective inner tubular members and tubular elements to the outlet means to thoroughly cool the complete length of said tubular elements and the space between the respective tubular elements and the portions of the wall member defining the apertures reducing heat conduction to the wall member.

2. In a gas-accommodating duct for a MHD generator a wall structure comprising a wall member having apertures therethrough, a sleeve member supported in each aperture in spaced relation thereto over the substantially greater portion of the extent of the aperture, a tubular thermally conductive element supported in each sleeve member and having one end portion projecting beyond the inner end of the associated sleeve member, said one end portion being closed, the cross-section of said projecting end portion being dimensioned so that the projecting portions of adjacent elements are spaced from one another, an inner tubular member disposed within and spaced from the interior of each tubular element, each inner tubular member extending to a position adjacent the closed end of each tubular element and terminating in an outlet end, inlet means connected to the other end of each tubular member, an outlet means connected to the other end of each tubular element whereby cooling liquid can flow through the inner tubular members into contact with the closed end of the tubular elements and thence in the reverse direction through the space between the respective inner tubular members and tubular elements to the outlet means to thoroughly cool the complete length of said tubular elements and the space between the respective sleeve members and the portions of the wall member defining the apertures reducing heat conduction to the wall member.

3. A gas accommodating duct as claimed in claim 2 in which the inner end of the sleeve member includes an inwardly tapered portion and each thermally conductive element having a complementary tapered portion for fitting thereinto.

References Cited by the Examiner

UNITED STATES PATENTS

| | | | |
|---|---|---|---|
| 2,599,179 | 6/1952 | Hopkins | 313—32 X |
| 2,953,706 | 9/1960 | Gallet | 310—4 X |
| 3,161,788 | 12/1964 | Russell | 310—11 |
| 3,178,596 | 4/1965 | Brogan | 310—11 |

OTHER REFERENCES

Publication: Engineering Aspects of Magnetohydrodynamics; Proceedings of the Second Symposium at Philadelphia, March 1961; edited by Manual and Mather, pp. 201 and 202.

MILTON O. HIRSHFIELD, *Primary Examiner.*

DAVID X. SLINEY, *Examiner.*